(12) United States Patent
Sigamani et al.

(10) Patent No.: US 9,450,496 B2
(45) Date of Patent: Sep. 20, 2016

(54) MULTI-STAGE POWER CONVERTERS AND METHODS FOR VARYING A REGULATED VOLTAGE OF ONE STAGE AS A FUNCTION OF AN OUTPUT CURRENT OF ANOTHER STAGE

(71) Applicant: Astec International Limited, Kowloon (HK)

(72) Inventors: James Sigamani, Pasig City (PH); Antonio Remetio Soleño, Mandaluyong City (PH)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 0 days.

(21) Appl. No.: 14/251,033

(22) Filed: Apr. 11, 2014

(65) Prior Publication Data

US 2014/0307483 A1 Oct. 16, 2014

Related U.S. Application Data

(60) Provisional application No. 61/810,825, filed on Apr. 11, 2013.

(51) Int. Cl.
*H02M 1/42* (2007.01)
*H02M 3/335* (2006.01)
*H02M 3/337* (2006.01)
*H02M 1/00* (2006.01)

(52) U.S. Cl.
CPC ....... *H02M 3/33546* (2013.01); *H02M 1/4225* (2013.01); *H02M 1/4258* (2013.01); *H02M 3/3376* (2013.01); *H02M 1/4241* (2013.01); *H02M 2001/007* (2013.01); *H02M 2001/0019* (2013.01); *Y02B 70/126* (2013.01); *Y02B 70/1433* (2013.01)

(58) Field of Classification Search
CPC ......... H02M 2001/007; H02M 3/335; H02M 3/33507; H02M 3/33515; H02M 3/33569; H02M 2001/4291; H02M 2001/0019
USPC ....... 363/13, 15–16, 20, 21.01–21.04, 21.07, 363/21.09, 21.1
See application file for complete search history.

(56) References Cited

U.S. PATENT DOCUMENTS

| | | |
|---|---|---|
| 7,184,280 B2 | 2/2007 | Sun et al. |
| 7,660,133 B1 | 2/2010 | Hwang et al. |
| 7,885,085 B2 | 2/2011 | Orr et al. |

(Continued)

*Primary Examiner* — Jessica Han
*Assistant Examiner* — David A. Singh
(74) *Attorney, Agent, or Firm* — Harness, Dickey & Pierce, P.L.C.

(57) ABSTRACT

A multi-stage power converter includes a pre-regulator circuit configured to provide a regulated output voltage, at least one DC/DC converter, and a control circuit coupled to the pre-regulator circuit and the DC/DC converter. The DC/DC converter is configured to provide an output voltage and an output current to a load. The DC/DC converter includes an input, an output, and at least one power switch. The input of the DC/DC converter is coupled to the pre-regulator circuit. The control circuit is configured to regulate the output voltage of the DC/DC converter and vary the regulated output voltage of the pre-regulator circuit as a function of the output current of the DC/DC converter.

23 Claims, 14 Drawing Sheets

(56) References Cited

U.S. PATENT DOCUMENTS

| | | |
|---|---|---|
| 8,102,164 B2 | 1/2012 | Colbeck et al. |
| 8,339,813 B2 | 12/2012 | Wang et al. |
| 8,467,199 B2 | 6/2013 | Lee et al. |
| 9,030,850 B2 * | 5/2015 | Chen ................. H02M 3/33507 363/21.16 |
| 9,190,898 B2 * | 11/2015 | Brinlee ............... H02M 1/4225 |
| 2008/0061891 A1 * | 3/2008 | Hongo ................... G01S 7/023 331/17 |
| 2010/0020578 A1 * | 1/2010 | Ryu et al. ....................... 363/68 |
| 2012/0025720 A1 * | 2/2012 | Chen et al. ............... 315/185 R |
| 2012/0081937 A1 * | 4/2012 | Phadke ........................... 363/95 |
| 2013/0003430 A1 * | 1/2013 | Reddy ............................ 363/74 |

\* cited by examiner

MULTI-STAGE POWER CONVERTERS AND METHODS FOR VARYING A REGULATED VOLTAGE OF ONE STAGE AS A FUNCTION OF AN OUTPUT CURRENT OF ANOTHER STAGE

CROSS-REFERENCE TO RELATED APPLICATION

This application claims the benefit of U.S. Provisional Application No. 61/810,825 filed Apr. 11, 2013. The entire disclosure of the above application is incorporated herein by reference.

FIELD

The present disclosure relates to power converters and methods of improving efficiency in the power converters.

BACKGROUND

This section provides background information related to the present disclosure which is not necessarily prior art.

Typical LLC resonant converters include power switches and a control circuit that adjusts a switching frequency of the power switches to regulate an output voltage of the LLC resonant converters. Preferably, the LLC resonant converters are operated in critically discontinuous conduction mode so that current through resonant elements (e.g., commonly referred to as a resonant inductor Lr and a resonant capacitor Cr) in the LLC resonant converters is zero for an infinitely small amount of time in each switching period. As a result, the power switches may be switched at zero current thereby optimizing efficiency in the LLC resonant converters. To achieve critically discontinuous conduction mode, the switching frequency of the power switches is substantially equal to the resonant frequency of the resonant elements.

Generally, the LLC resonant converters are designed to operate in critically discontinuous conduction mode when a load operates at a fixed load condition (e.g., 50% load, etc.). This ensures the switching frequency of the power switches are not substantially adjusted when regulating the output voltage of the LLC resonant converters as explained above.

SUMMARY

This section provides a general summary of the disclosure, and is not a comprehensive disclosure of its full scope or all of its features.

According to one aspect of the present disclosure, a multi-stage power converter includes a pre-regulator circuit configured to provide a regulated output voltage, at least one LLC resonant converter, and a control circuit coupled to the pre-regulator circuit and the LLC resonant converter. The LLC resonant converter is configured to provide an output voltage and an output current to a load. The LLC resonant converter includes an input, an output, one or more resonant elements, and at least one power switch. The input of the LLC resonant converter is coupled to the pre-regulator circuit. The control circuit is configured to regulate the output voltage of the LLC resonant converter and vary the regulated output voltage of the pre-regulator circuit as a function of the output current of the LLC resonant converter.

According to another aspect of the present disclosure, a multi-stage power converter includes a pre-regulator circuit configured to provide a regulated output voltage, at least one DC/DC converter, and a control circuit coupled to the pre-regulator circuit and the DC/DC converter. The DC/DC converter is configured to provide an output voltage and an output current to a load. The DC/DC converter includes an input, an output, and at least one power switch. The input of the DC/DC converter is coupled to the pre-regulator circuit. The control circuit is configured to regulate the output voltage of the DC/DC converter and vary the regulated output voltage of the pre-regulator circuit as a function of the output current of the DC/DC converter.

According to another aspect of the present disclosure, a method of operating a DC/DC converter is disclosed. The DC/DC converter is configured to receive a regulated output voltage from a pre-regulator circuit. The method includes regulating an output voltage of the DC/DC converter, and varying the regulated output voltage of the pre-regulator circuit as a function of an output current of the DC/DC converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
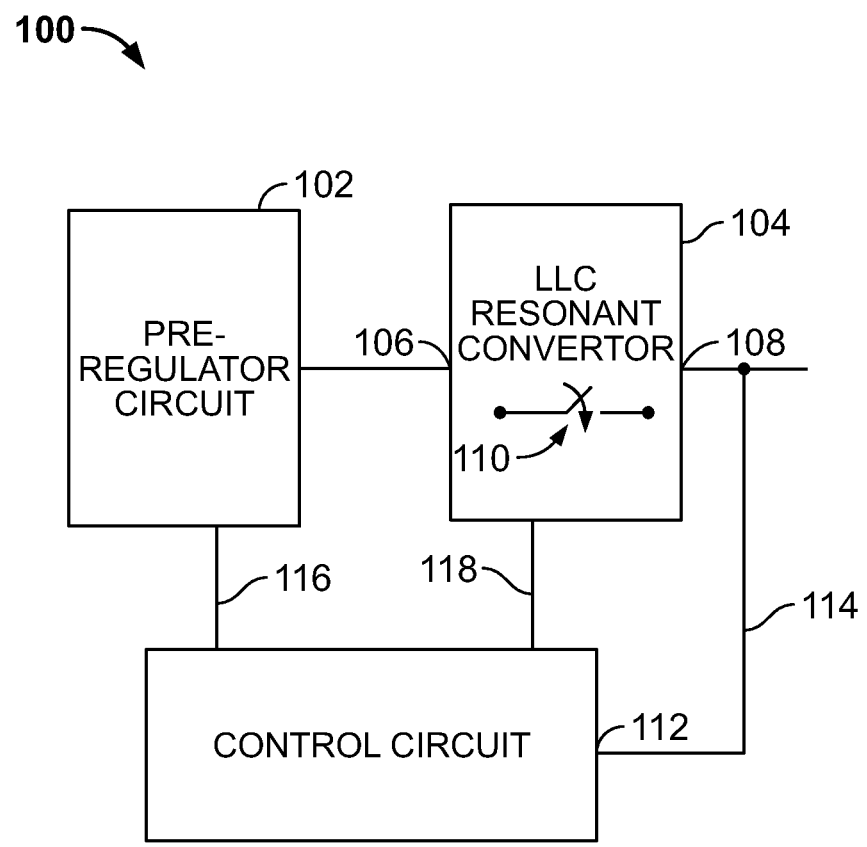
FIG. 1 is a block diagram of a multi-stage power converter including a pre-regulator circuit and a LLC resonant converter according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A multi-stage power converter according to one example embodiment of the present disclosure is illustrated in FIG. 1 and indicated generally by reference number 100. As shown in FIG. 1, the multi-stage power converter 100 includes a pre-regulator circuit 102, a LLC resonant converter 104, and a control circuit 112 coupled to the pre-regulator circuit 102 and the LLC resonant converter 104. The LLC resonant includes an input 106, an output 108, one or more resonant elements (not shown in FIG. 1), and a power switch 110. The input 106 of the LLC resonant converter 104 is coupled to the pre-regulator circuit 102. The pre-regulator circuit 102 provides a regulated output voltage to the LLC resonant converter 104. The LLC resonant converter 104 provides an output voltage and an output current to a load (not shown in FIG. 1).

The control circuit 112 regulates the output voltage of the LLC resonant converter 104 and varies the regulated output voltage of the pre-regulator circuit 102 as a function of the output current of the LLC resonant converter 104. By controlling the pre-regulator circuit 102 and the LLC resonant converter 104 in this way, the LLC resonant converter 104 may operate substantially in a desired mode. For example, depending on design, load conditions, etc., the LLC resonant converter 104 may be operated substantially in critically discontinuous conduction mode (as referred to herein), continuous conduction mode, etc. As a result of operating substantially in a desired mode (e.g., critically discontinuous conduction mode), the power switch 110 (and other power switches in the LLC resonant converter) may be turned on and/or off at zero current conditions thereby optimizing efficiency of the LLC resonant converter 104.

In some cases, the LLC resonant converter 104 may include one or more components having a resistive component. These resistive components cause a voltage drop in the LLC resonant converter 104. Thus, to regulate the output voltage of the LLC resonant converter 104, a switching frequency of the power switch 110 may be adjusted to compensate for the voltage drop. However, by adjusting the switching frequency, the LLC resonant converter 104 may no longer operate in critically discontinuous conduction mode because the adjusted switching frequency may be different than a resonant frequency in the LLC resonant converter 104. As a result, zero current switching of the power switch 110 may not be achieved.

Instead, the control circuit 112 may switch the power switch 110 at a substantially fixed switching frequency and vary the regulated output voltage of the pre-regulator circuit 102 (and thereby the input voltage of the LLC resonant converter 104) as a function of the output current of the LLC resonant converter 104. This may compensate for the voltage drop caused by the resistive components in the LLC resonant converter 104. As a result, the LLC resonant converter 104 may operate substantially in a desired mode (e.g., critically discontinuous conduction mode, etc.) and thereby zero current switching of the power switch 110 (and other power switches in the LLC resonant converter) may be achieved.

Additionally, load conditions of the load coupled to the LLC resonant converter 104 may change, for example, from half-load to full-load. This change in load conditions may cause the output current from the LLC resonant converter 104 to increase. Thus, the regulated output voltage of the pre-regulator circuit 102 may be varied (e.g., increased) as a function of this increasing output current of the LLC resonant converter 104. Alternatively, the regulated output voltage of the pre-regulator circuit 102 may be decreased as a function of a decreasing output current of the LLC resonant converter 104.

In the example of FIG. 1, the control circuit 112 receives a sensed parameter via signal 114 of the LLC resonant converter 104. The sensed parameter may include a sensed output voltage and/or a sensed output current of the LLC resonant converter 104. Additionally, and/or alternatively, the control circuit 112 may receive other sensed parameters from the LLC resonant converter 104, sensed parameters from the pre-regulator circuit 102, etc. For example, the control circuit 112 may receive a sensed input current and/or voltage of the LLC resonant converter 104.

Additionally, the control circuit 112 provides a signal 116 to the pre-regulator circuit 102 and a signal 118 to the LLC resonant converter 104. The signal 116 may control a switch (not shown) in the pre-regulator circuit 102 to vary the regulated output voltage of the pre-regulator circuit 102 as a function of the output current of the LLC resonant converter 104 as explained above. The signal 118 may be employed to control the power switch 110 to regulate the output voltage of the LLC resonant converter 104.

As explained above, the regulated output voltage of the pre-regulator circuit 102 is varied as function of the output current of the LLC resonant converter 104. For example, the regulated output voltage of the pre-regulator circuit 102 may be varied in proportion to the output current of the LLC resonant converter 104 or in any other suitable function of the output current of the LLC resonant converter 104.

The LLC resonant converter 104 may be any suitable resonant switching power converter having one power switch (as shown in FIG. 1) or more than one power switches.

Figure 2:
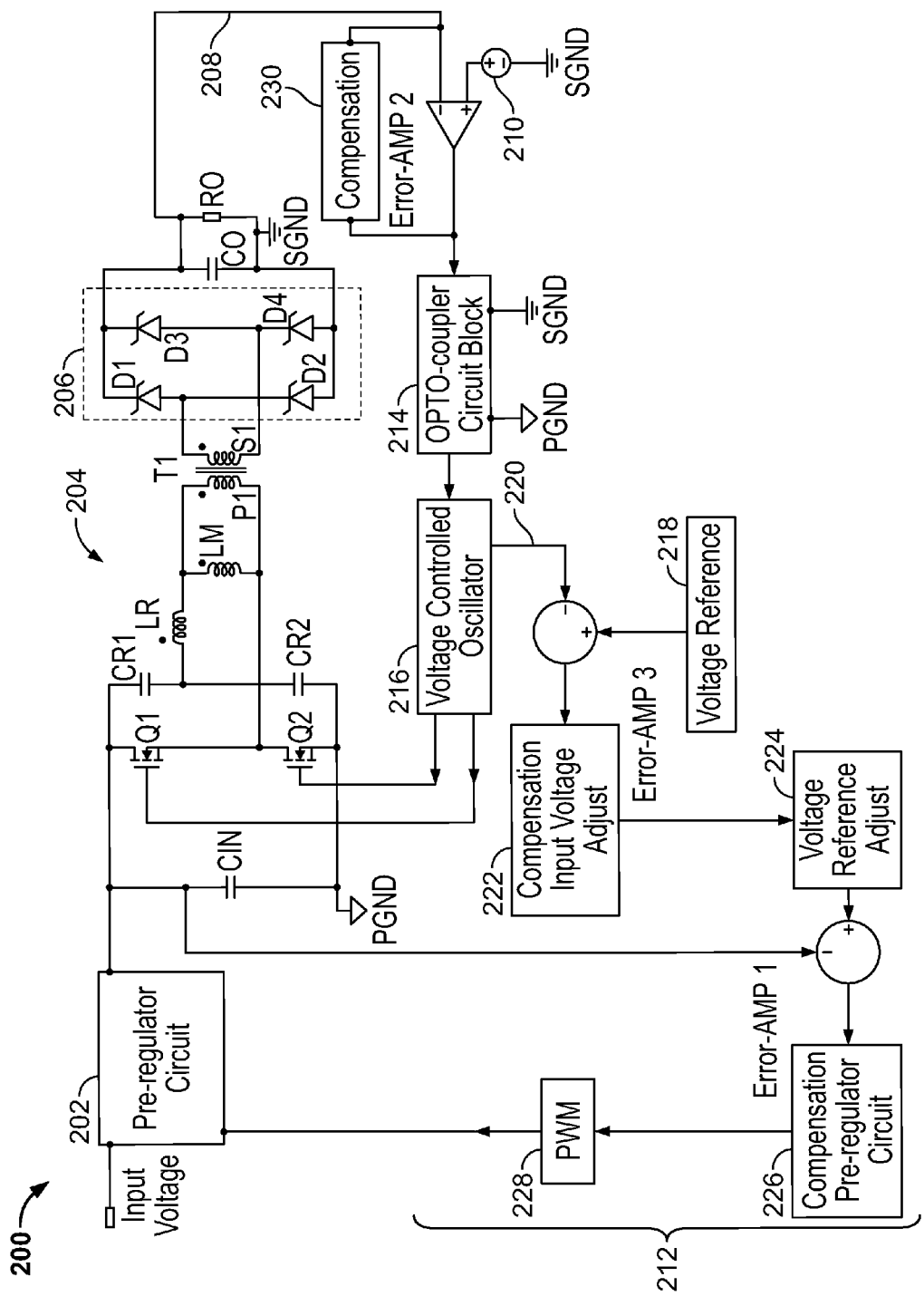
FIG. 2 is a schematic of a multi-stage power converter including a pre-regulator circuit and a LLC half bridge resonant converter according to another example embodiment.

FIG. 2 illustrates one example multi-stage power converter 200 including a pre-regulator circuit 202, a LLC resonant converter 204, and a control circuit 212. As shown in FIG. 2, an input of the LLC resonant converter 204 is coupled to an output of the pre-regulator circuit 202 and an output of the LLC resonant converter 204 is coupled to a load (shown as a resistor Ro).

The LLC resonant converter 204 may include filters coupled to the input and the output of the LLC resonant converter 204. For example, as shown in FIG. 2, a capacitor Cin is coupled across the input of the LLC resonant converter 204 and a capacitor Co is coupled across the output of the LLC resonant converter 204. Alternatively, any suitable filter having different and/or additional filtering elements may be employed without departing from the scope of the present disclosure.

As shown in the example embodiment of FIG. 2, the LLC resonant converter 204 is a half bridge converter having a transformer T1 coupled to a rectification circuit 206. The LLC resonant converter 204 includes power switches Q1, Q2 coupled to a primary winding P1 of the transformer T1. A secondary winding S1 of the transformer T1 is coupled to the output of the LLC resonant converter 204 via the rectification circuit 206.

The rectification circuit 206 is a center tapped full wave rectifier and includes diodes D1, D2, D3, D4. Although the example of FIG. 2 illustrates the rectification circuit 206 as including diode rectifiers, synchronous rectifier FETs (e.g., MOSFETs) may be used to further improve efficiency. In this case, zero current switching of the MOSFETs may be achieved as explained above.

In the example of FIG. 2, a magnetizing inductance of the transformer T1 is represented by an inductor Lm. Additionally, the LLC resonant converter 204 may employ other resonant elements coupled to the primary winding P1. In the example of FIG. 2, the LLC resonant converter 204 includes capacitors CR1, CR2 coupled to the power switches Q1, Q2, respectively and an inductor Lr coupled between the capacitors CR1, CR2 and the power switches Q1, Q2 (via the primary winding P1 of transformer T1).

For clarity, the inductor Lr is shown as a separate external inductor from the transformer T1. However, it should be apparent that the inductor Lr may include separate external inductances (e.g., from an inductor) as well as leakage and/or parasitic inductances from the transformer T1.

The resonant elements (e.g., the magnetizing inductance of the transformer T1, capacitors CR1, CR2, inductor Lr, etc.) may be any suitable value depending on desired results. For example, a value of each resonant element may be sufficient to cause zero current switching of the power switches Q1, Q2 of the LLC resonant converter 204.

In the example of FIG. 2, the control circuit 212 may regulate the output voltage of the LLC resonant converter 204 via a feedback signal 208 of the LLC resonant converter 204 and vary the regulated output voltage of the pre-regulator circuit 202 based, in part, on the feedback signal 208 of the LLC resonant converter 204. As shown in FIG. 2, the feedback signal 208 may be a sensed output voltage of the LLC resonant converter 204.

For example, the control circuit 212 may regulate the output voltage of the LLC resonant converter 204 by comparing the feedback signal 208 with a fixed reference voltage 210 representing, for example, a steady-state output voltage of the LLC resonant converter 204 by an error amplifier Error-Amp2. In the example of FIG. 2, the error amplifier Error-Amp2 includes an operational amplifier having feedback (shown as a compensation block 230) to compensate for the difference between the output voltage of the LLC resonant converter 204 and the fixed reference voltage 210. An output of the error amplifier Error-Amp2 may be provided to an opto-coupler circuit block 214 which provides isolation between a primary side and a secondary side of the control circuit 212.

As shown in FIG. 2, an output of the opto-coupler circuit block 214 may be provided to a voltage controlled oscillator (VCO) 216 which provides signals to the power switches Q1, Q2 to regulate the output voltage of the LLC resonant converter 204. In some cases, the control circuit 212 may switch the power switches Q1, Q2 at a varying switching frequency to compensate for a voltage drop in the LLC resonant converter 204 as further explained below.

The VCO 216 may also provide a reference feedback voltage 220 to an error amplifier Error-Amp3. The reference feedback voltage 220 may represent a variable reference based on variation of the load coupled to the LLC resonant converter 104 (e.g., a variation of the output current of the LLC resonant converter 104). In the example of FIG. 2, the variable reference is the switching frequency of the power switches Q1, Q2. Alternatively, any suitable variable reference may be employed including, for example, a current of the LLC resonant converter 204, etc.

The error amplifier Error-Amp3 may compare the reference voltage 220 to a fixed voltage reference 218 representing a parameter at a specific load condition. For example, the voltage reference 218 may represent a switching frequency equal to a resonant frequency of the resonant elements at a specific load condition (e.g., 50% load, etc.). This switching frequency, for example, corresponds to a switching frequency that enables the LLC resonant converter 204 to operate in critically discontinuous conduction mode as explained above.

The error amplifier Error-Amp3 may provide an output to a compensation input voltage adjust block 222 which determines a desired adjustment for the input voltage of the LLC resonant converter 204. A voltage reference adjust block 224 may then provide a reference voltage which is adjustable based on an output of the compensation input voltage adjust block 222. The reference voltage from the voltage reference adjust block 224 may be compared to a sensed output voltage of the pre-regulator circuit 202 (or input voltage of the LLC resonant converter 204) by an error amplifier Error-Amp1.

The error amplifier Error-Amp1 may then provide an output to a compensation pre-regulator circuit block 226 which then provides a signal representing a required adjustment of the output voltage of the pre-regulator circuit 202 to a PWM driver 228. The PWM driver 228 may then provide a PWM signal to one or more switches (not shown) in the pre-regulator circuit 202 to vary the regulated output voltage of the pre-regulator circuit 202 in proportion to the output current of the LLC resonant converter 204. Thus, as explained above, the LLC resonant converter 204 may operate substantially in critically discontinuous conduction mode. As a result, zero current switching of the power switches Q1, Q2 may be achieved thereby optimizing efficiency of the LLC resonant converter 204.

In the example of FIG. 2, a control loop bandwidth of the error amplifier Error-Amp3 is lower than control loop bandwidths of the pre-regulator circuit 202 and the LLC resonant converter 204. This ensures the control loop of the error amplifier Error-Amp3 is executed slower than the control loops of the pre-regulator circuit 202 and the LLC resonant converter 204.

For example, the control loop bandwidth of the error amplifier Error-Amp3 may be low enough to create a desired separation between the control loop bandwidths of the pre-regulator circuit 202 and the LLC resonant converter 204 and the control loop bandwidth of the error amplifier Error-Amp3. This separation may help to avoid interaction between the control loops. In some embodiments, the desired separation between the control loop bandwidths may be about one decade.

In some cases, the control loop bandwidth of the LLC resonant converter 204 may be higher than the control loop bandwidth of the pre-regulator circuit 202. For example, the control loop bandwidth of the LLC resonant converter 204 may be about 3 kHz to about 5 kHz and the control loop bandwidth of the pre-regulator circuit 202 may be about 10 Hz. As a result, the control loop of the LLC resonant converter 204 executes faster than the control loop of the pre-regulator circuit 202 during, for example, changing load conditions. In this case, the switching frequency of the power switches Q1, Q2 may be adjusted to regulate the output voltage of the LLC resonant converter to a steady state. Then, the regulated output voltage of the pre-regulator circuit 202 may be adjusted until the switching frequency is readjusted to the resonant frequency (or to a reference frequency as further explained below).

Figure 3:
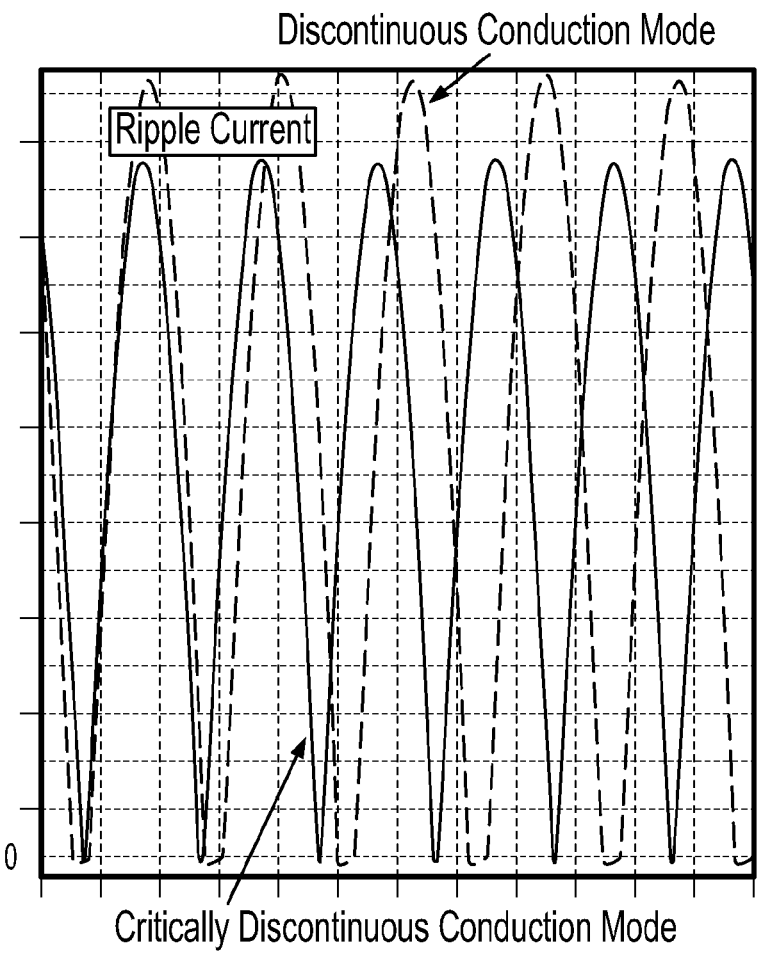
FIG. 3 is a graph illustrating ripple current in an output capacitor of the LLC half bridge resonant converter of FIG. 2.

By operating the LLC resonant converter 204 substantially in critically discontinuous conduction mode, zero current switching of the power switches Q1, Q2 is achieved at lower RMS current than compared to, for example, in discontinuous conduction mode. Additionally, by operating in critically discontinuous conduction mode, RMS ripple current in the capacitor Co may be reduced. For example, as shown in FIG. 3, ripple current in the capacitor Co when the LLC resonant converter 204 is operating in critically discontinuous conduction mode is lower compared to when the LLC resonant converter 204 is operating in discontinuous conduction mode. In some cases, the ripple current in the capacitor Co may be about 20% lower when the LLC resonant converter 204 is operating in critically discontinuous conduction as opposed to in discontinuous conduction mode.

Referring back to FIG. 2, because some power regulatories require peak efficiency at half (i.e., 50%) load, the LLC resonant converter 204 may be designed to operate in critically discontinuous conduction mode at half load. For example, the switching frequency of the power switches Q1, Q2 when the LLC resonant converter 204 is operating in critically discontinuous conduction mode at half-load may be a reference frequency and the adjustable reference voltage provided by the voltage reference adjust block 224 of FIG. 2 may be a nominal value.

When the LLC resonant converter 204 is operating at full-load (i.e., 100%), the adjustable reference voltage may be increased (e.g., due to an increase in output current of the LLC resonant converter 204) which thereby increases the regulated output voltage of the pre-regulator circuit 202 (e.g., in proportion to the increased output current). The increase in the regulated output voltage of the pre-regulator circuit 202 (or input voltage of the LLC resonant converter 204) may compensate for the voltage drop of the LLC resonant converter (as explained above).

Alternatively, when the LLC resonant converter 204 is operating at no load (0%), the adjustable reference voltage may be decreased (e.g., due to a decrease in output current of the LLC resonant converter 204) which thereby decreases the regulated output voltage of the pre-regulator circuit 202.

Thus, by adjusting the regulated output voltage of the pre-regulator circuit 202 (or input voltage of the LLC resonant converter 204), the switching frequency of the power switches Q1, Q2 may be nearly fixed and substantially equal to the resonant frequency throughout a range of different load conditions. As a result, the LLC resonant converter 204 may continue to operate substantially in critically discontinuous conduction mode throughout the range of different load conditions and thereby optimizing efficiency of the LLC resonant converter 204 as explained above.

Alternatively, if higher efficiency may be achieved by operating the LLC resonant converter 204 in, for example, continuous conduction mode, then a corresponding switching frequency at a particular load condition may be a reference frequency. In some cases, efficiency may be increased if the LLC resonant converter 204 is operated in continuous conduction mode. This may be due to lower RMS currents in the power switches Q1, Q2 observed during continuous conduction mode.

Figure 4:
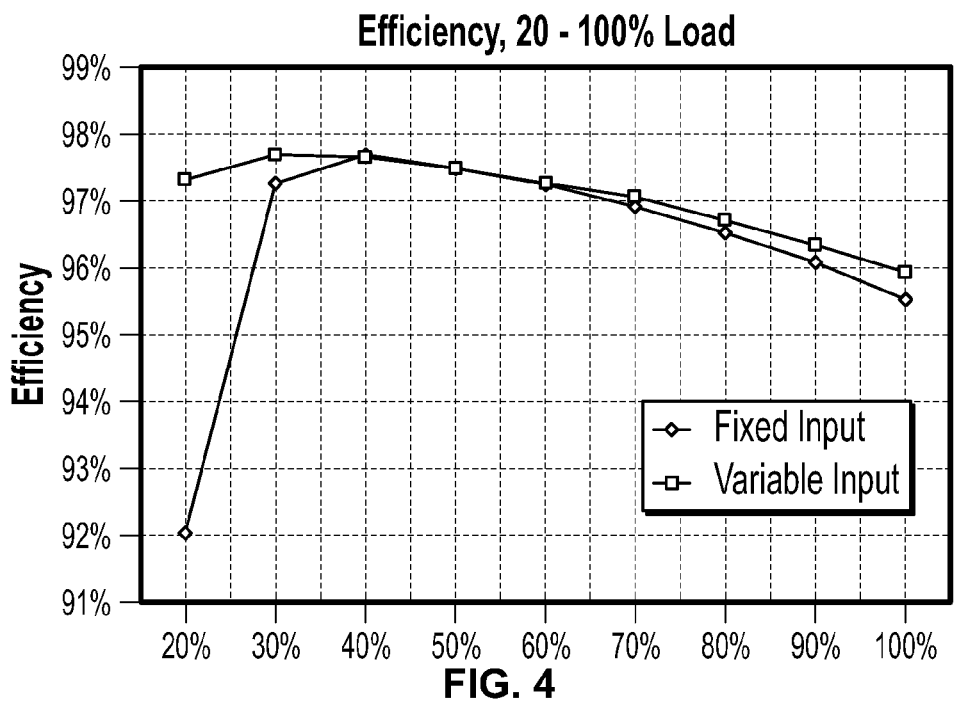
FIG. 4 is graph illustrating efficiency of a LLC resonant converter employing a fixed input voltage and efficiency of a LLC resonant converter employing a variable input voltage.

FIG. 4 is a graph showing efficiency of a LLC resonant converter employing a fixed input voltage and efficiency of a LLC resonant converter (e.g., the converter 204 of FIG. 2) employing a variable input voltage at load conditions of 20% to 100%. As shown in FIG. 4, the efficiency of the LLC resonant converter employing the variable input voltage is generally higher than the efficiency of the LLC resonant converter employing the fixed input voltage.

Figure 5:
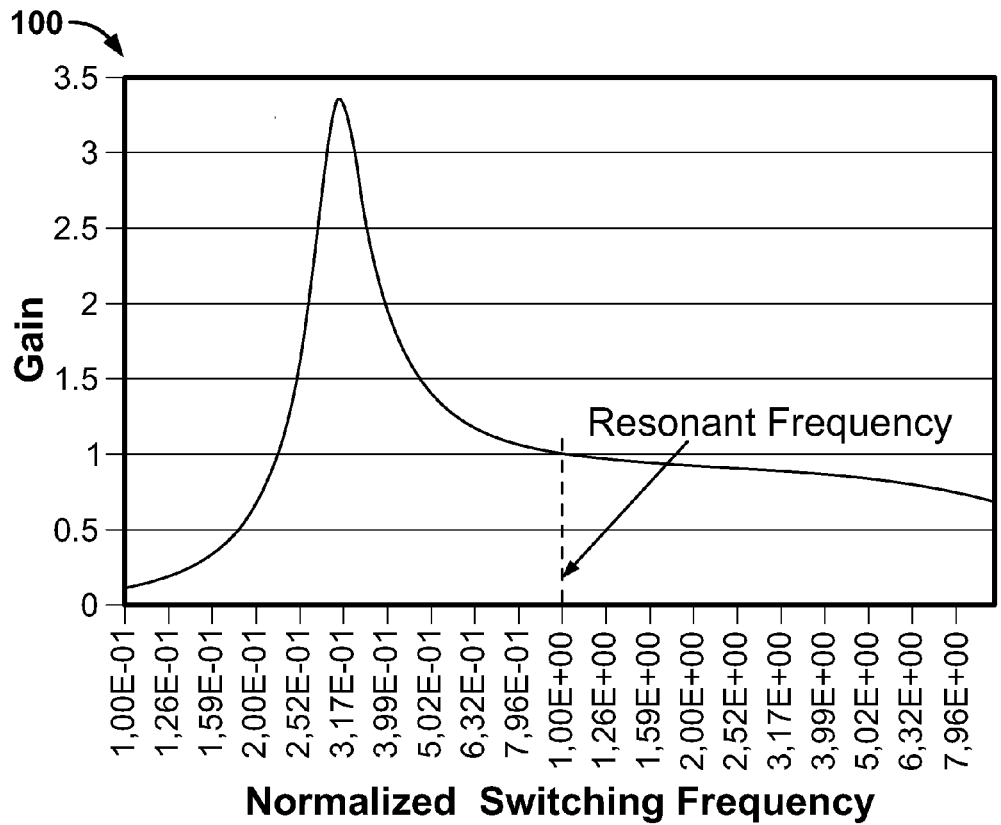
FIG. 5 is a graph illustrating a gain plot of a transfer function of the LLC half bridge resonant converter of FIG. 2.

FIG. 5 illustrates an example gain plot 500 of a transfer function of the LLC resonant converter 204. Equation (1) below is an example transfer function of the LLC resonant converter 204.

$$\frac{Vo}{Vin} = \frac{M(fsw)}{2n} \quad (1)$$

In the example equation (1), Vo is the output voltage of the LLC resonant converter 204, Vin is the input voltage of the LLC resonant converter 204, n is the turns ratio for the transformer T1, and M(fsw) is the voltage conversion ratio as a function of the switching frequency of the power switches Q1, Q2. As generally known by those skilled in the art, M(fsw) may be a function of many parameters including, for example, a quality (Q) factor of the LLC resonant converter 204, a ratio of the inductor Lm to the inductor Lr, a ratio of the resonant frequency to the switching frequency, etc.

As shown in FIG. 5, the gain is inversely proportional to the normalized switching frequency. For example, the gain increases if the normalized switching frequency decreases (and vice-versa). Additionally, the gain is one (1) when the normalized switching frequency is equal to the resonant frequency.

Figure 6:
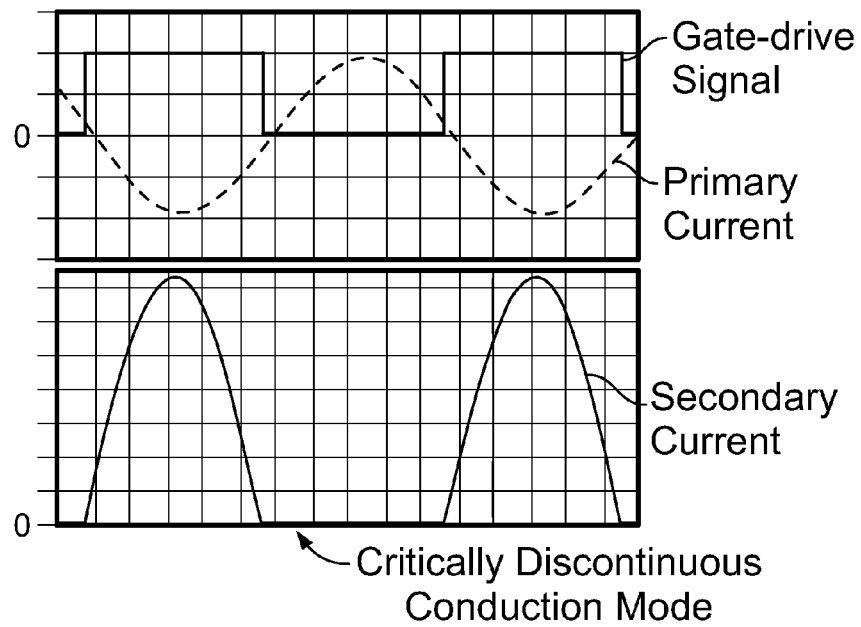
FIG. 6 is a graph illustrating a gate drive signal and current flowing through the LLC half bridge resonant converter of FIG. 2.

FIG. 6 illustrates an example gate drive signal, an example waveform of current flowing through the primary winding P1 of the transformer T1, and an example waveform of current flowing through the secondary winding S1 of the transformer T1 of FIG. 2. As shown in FIG. 6, the power switches Q1, Q2 and switches on the secondary side of the transformer T1 (e.g., switches in the rectification circuit 206) may be switched at or near zero current.

Figure 7:
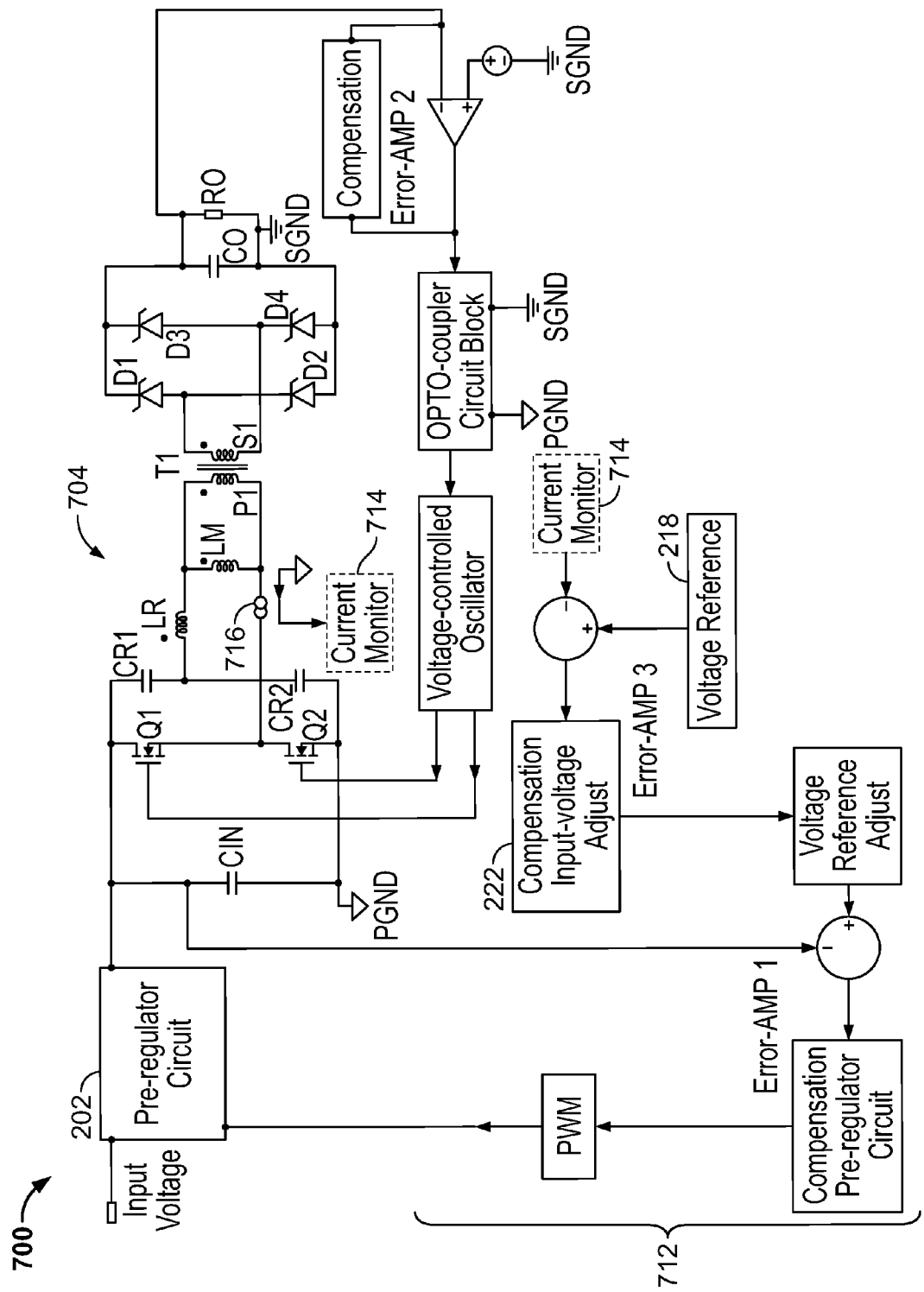
FIG. 7 is a schematic of a multi-stage power converter including a pre-regulator circuit and a LLC half bridge resonant converter according to another example embodiment.

FIG. 7 illustrates another example multi-stage power converter 700 including the pre-regulator circuit 202 of FIG. 2, a LLC resonant converter 704, and a control circuit 712. The LLC resonant converter 704 is substantially similar to the LLC resonant converter 204 of FIG. 2. However, the LLC resonant converter 704 includes a current sensor 716 for monitoring a current in the LLC resonant converter 704. In the example of FIG. 7, the current sensor 716 is positioned between the primary winding P1 of the transformer T1 and the power switches Q1, Q2 to sense the current flowing in the primary winding P1. Alternatively, a current sensor may be positioned in any suitable location to sense a desired current (e.g., an output current) in the LLC resonant converter 704.

The control circuit 712 is substantially similar to the control circuit 212 of FIG. 2. However, the control circuit 712 monitors current (block 714) via the current sensor 716. As shown in FIG. 7, the current monitor block 714 may provide an output to the error amplifier Error-Amp3. The monitored current may represent a variable reference based on variation of a load (shown as resistor Ro in FIG. 7) coupled to the LLC resonant converter 704. In the example of FIG. 7, the current monitored (via the current sensor 716) is a current proportional to the output current of the LLC resonant converter 704. Alternatively, the current monitored may be the output current or any other suitable current in the LLC resonant converter 704.

As shown in FIG. 7, the error amplifier Error-Amp3 may compare the output of the current monitor block 714 to the fixed voltage reference 218 representing a parameter at a specific load condition as explained above. The error amplifier Error-Amp3 may then provide an output to the compensation input voltage adjust block 222 which determines the desired adjustment for the input voltage of the LLC resonant converter 704 as explained above.

Figure 8:
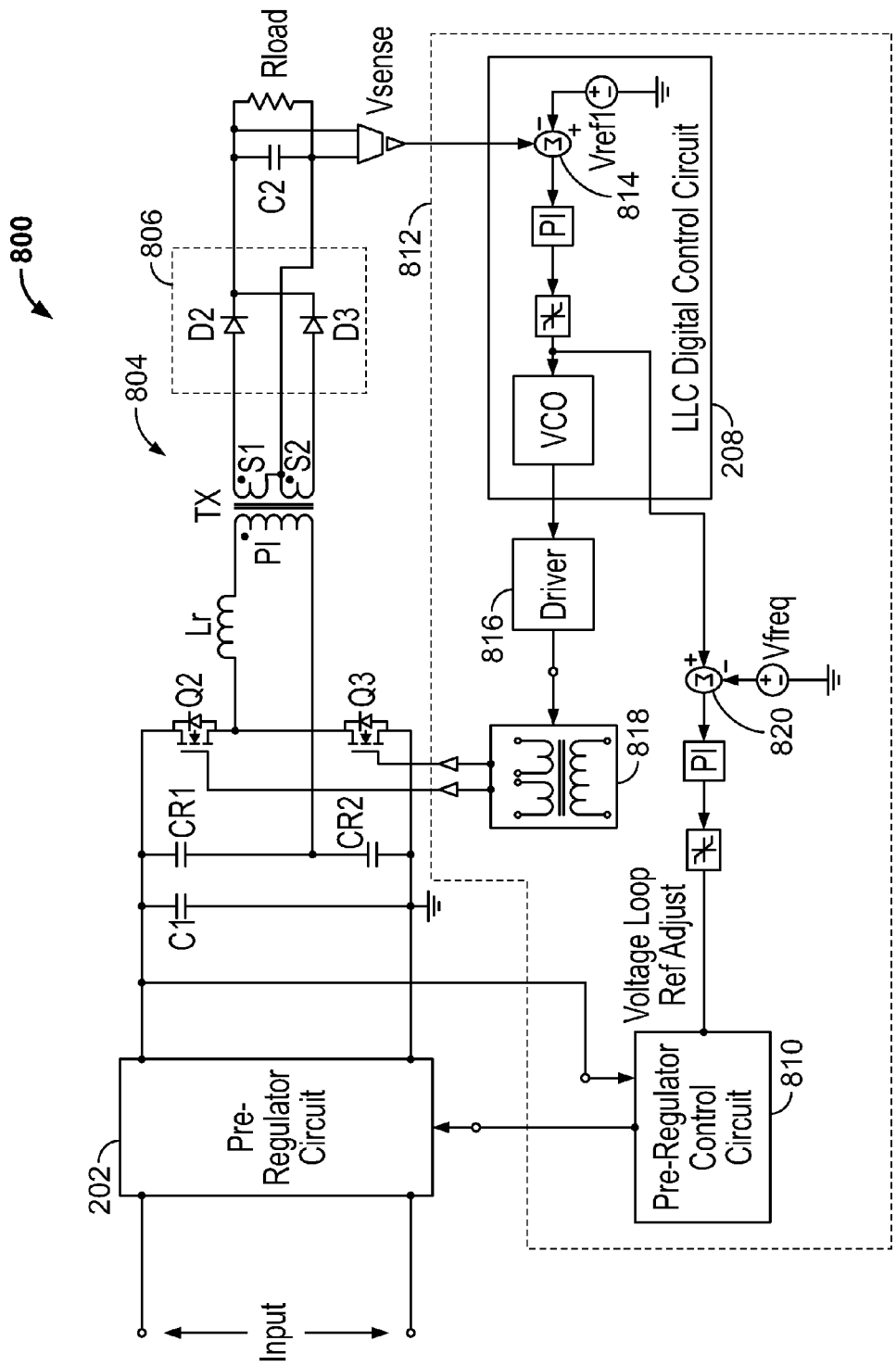
FIG. 8 is a schematic of a multi-stage power converter including a pre-regulator circuit, a LLC half bridge resonant converter, and a control circuit including digital circuitry according to still another example embodiment.

FIG. 8 illustrates another example multi-stage power converter 800 including the pre-regulator circuit 202 of FIG. 2, a LLC resonant converter 804, and a control circuit 812. As shown in FIG. 8, the LLC resonant converter 804 is a half bridge converter having a transformer TX coupled to a rectification circuit 806. The LLC resonant converter 804 includes power switches Q2, Q3 coupled to a primary winding P1 of the transformer TX. Secondary windings S1, S2 of the transformer TX are coupled to an output of the LLC resonant converter 804 via the rectification circuit 806. The rectification circuit 806 is a center tapped full wave rectifier and includes diodes D1, D2.

Although the example of FIG. 8 illustrates the rectification circuit 806 as including diode rectifiers, synchronous rectifier FETs (e.g., MOSFETs) may be used to further improve efficiency. In this case, zero current switching of the MOSFETs may be achieved as explained above.

The LLC resonant converter 804 includes capacitor filters coupled to an input and an output of the LLC resonant converter 804. For example, as shown in FIG. 8, a capacitor C1 is coupled across the input of the LLC resonant converter 804 and a capacitor C2 is coupled across the output of the LLC resonant converter 804.

Additionally, and as explained above, the LLC resonant converter 804 includes resonant elements coupled to the primary winding P1. In the example of FIG. 8, the LLC resonant converter 804 includes capacitors CR1, CR2 coupled to the power switches Q2, Q3, respectively, and an inductor Lr coupled between the power switches Q2, Q3 and the capacitors CR1, CR2 (via the primary winding P1).

In the example of FIG. 8, the control circuit 812 includes a LLC digital control circuit 808 and a pre-regulator control circuit 810. The output voltage of the LLC resonant converter 804 is regulated by the control circuit 808 via a feedback signal of the LLC resonant converter 804 and the regulated output voltage of the pre-regulator circuit 202 is varied by the control circuit 810 based, in part, on the feedback signal of the LLC resonant converter 804.

For example, the control circuit 808 receives a sensed output voltage of the LLC resonant converter 804 (via a voltage sensor Vsense). The sensed output voltage may be compared to a fixed reference voltage Vref1 by an error amplifier 814. The fixed reference voltage Vref1 represents a steady-state output voltage of the LLC resonant converter 804. An output of the error amplifier 814 may be processed by a PI controller and provided to a voltage controlled oscillator VCO.

The voltage controlled oscillator VCO may provide pulses to a driver 816 of the control circuit 812. The pulses from the voltage controlled oscillator VCO may have a frequency inversely proportional to the processed output of the error amplifier 814. In this way, the processed output of the error amplifier 814 may be representative of the switching frequency which may vary to regulate the output voltage of the LLC resonant converter 804.

The driver 816 may output signals to the power switches Q2, Q3 via an isolation transformer 818 (and buffers) to control switching of the power switches Q2, Q3.

As shown in FIG. 8, the processed output of the error amplifier 814 may also be provided to an error amplifier 820. The error amplifier 820 compares the processed output of the error amplifier 814 and a voltage reference Vfreq representing a switching frequency equal to a resonant frequency of the resonant elements at a specific load condition (e.g., 50% load, etc.). An output of the error amplifier 820 is processed and then provided to the pre-regulator control circuit 810. Based on the processed output of the error amplifier 820 and a sensed parameter (e.g., the output voltage and/or current of the pre-regulator control circuit 202), the pre-regulator control circuit 810 generates one or more signals to control one or more switches (not shown) of the pre-regulator circuit 202.

Figure 9:
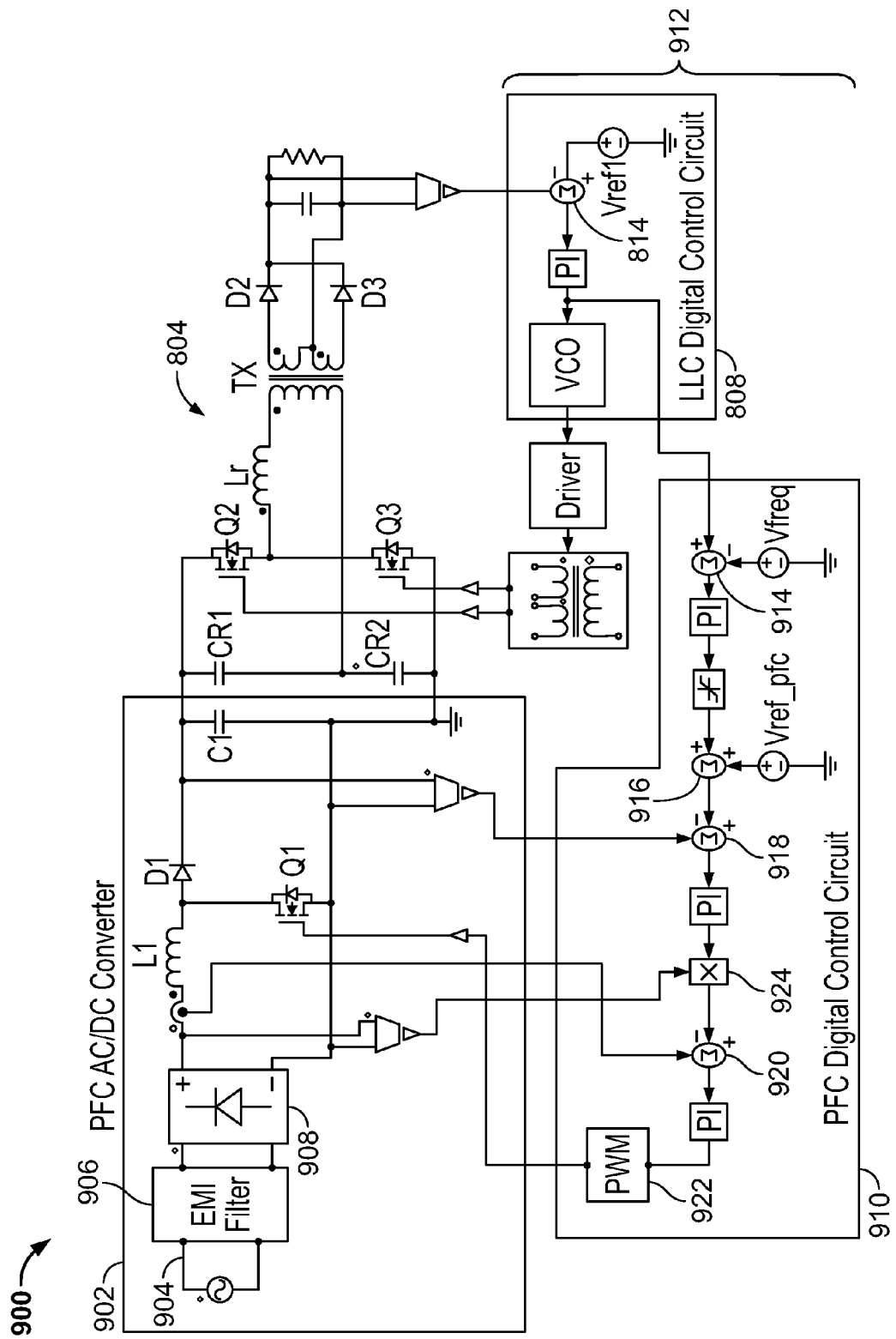
FIG. 9 is a schematic of a multi-stage power converter including a PFC AC/DC converter, the LLC half bridge resonant bridge converter of FIG. 8, and a control circuit including digital circuitry according to yet another example embodiment.

FIG. 9 illustrates another example multi-stage power converter 900 including a pre-regulator circuit 902, the LLC resonant converter 804 of FIG. 8, and a control circuit 912. In the example of FIG. 9, the pre-regulator circuit 902 is a PFC AC/DC converter. The pre-regulator circuit 902 includes an inductor L1, a power switch Q1, and a diode D1 arranged in a boost converter topology. The pre-regulator circuit 902 also includes an input 904, an EMI filter 906 coupled to the input 904, a rectifier 908 between the inductor L1 and the EMI filter 906, and a capacitor C1 coupled across an output of the pre-regulator circuit 902.

In the example of FIG. 9, the control circuit 912 includes the LLC digital control circuit 808 of FIG. 8 to regulate the output voltage of the LLC resonant converter 804. For clarity, some components of the control circuit 808 are not shown in FIG. 9. The control circuit 912 also includes a PFC digital control circuit 910. The PFC digital control circuit 910 includes four error amplifiers 914, 916, 918, 920, two PI controllers, and a PWM driver 922.

The processed output of the error amplifier 814 (explained above) may be provided to the error amplifier 914. The error amplifier 914 compares the processed output of the error amplifier 814 and a voltage reference Vfreq representing a switching frequency equal to a resonant frequency of the resonant elements at a specific load condition (e.g., 50% load, etc.). An output of the error amplifier 914 is processed and provided to the error amplifier 916 which compares the output of the error amplifier 914 to a voltage reference Vref_pfc. An output of the error amplifier 916 is provided to the error amplifier 918 which compares a sensed output voltage of the pre-regulator circuit 902 to the output of the error amplifier 916.

As shown in FIG. 9, an output of the error amplifier 918 may be processed and then multiplied (via a multiplier 924) by a sensed rectified input voltage of the pre-regulator circuit 902. The error amplifier 920 may compare a sensed inductor current of the pre-regulator circuit 902 with an output of the multiplier 924. An output of the error amplifier 920 may be processed and provided to the PWM driver 922 which generates a signal to control the power switch Q1 of the pre-regulator circuit 902. Thus, and as explained above, the regulated output voltage of the pre-regulator circuit 902 may be varied.

For example, when the regulated output voltage of the pre-regulator circuit 902 (or the input voltage of the LLC resonant converter 804) decreases, the output voltage of the LLC resonant converter 804 may decrease. Therefore, the output of the error amplifier 814 will become more positive (e.g., the difference between the sensed output voltage and the fixed reference voltage Vref1 increases). Thus, the output of the error amplifiers 914, 916, 918, 920 become more positive as well. As a result, the signal from the PWM driver 922 is adjusted and the regulated output voltage of the pre-regulator circuit 902 may increase.

This process may continue until the frequency of the voltage controlled oscillator VCO substantially equals a reference frequency while the output voltage of the LLC resonant converter 804 is regulated to a voltage set by the fixed reference voltage Vref1. For example, as explained above, the reference frequency may be a switching frequency of the power switches Q2, Q3 when the LLC resonant converter 804 is operating in critically discontinuous conduction mode at half-load (50%).

Alternatively, an analog approach may be employed if desired. For example, an on-time of the signals provided to the power switches Q2, Q3 may change while a dead-time may remain constant. As explained above, to achieve critically discontinuous conduction mode, a switching frequency of the power switches Q2, Q3 may be substantially equal to the resonant frequency of the resonant elements in the LLC resonant converter 804. At the resonant frequency, the on-time of the signals may be substantially equal to about half the resonant time of the resonant elements. This translates into a particular duty cycle (i.e., on-time/total period) of the signals so that the converter 804 may operate in critically discontinuous conduction mode.

For example, the LLC resonant converter 804 may be designed to operate in critically discontinuous conduction mode at a particular line and load condition (e.g., half-load). If the resonant time of the resonant elements is about 4.5 usec and the dead-time of the signals is about 0.5 usec, the power switches Q2, Q3 may have a duty cycle of about 45% so that the converter 804 operates in critically discontinuous conduction mode. Therefore, the power switches Q2, Q3 may require a particular duty cycle (e.g., 45%) so that the converter 804 operates in critically discontinuous conduction mode at a particular load condition (e.g., half-load).

If the two signals (having the duty cycle of 45%) are provided to an "OR" gate, a resulting signal having a duty cycle of 90% may be achieved at this particular load condition. The resulting signal may be provided to an averaging filter which may output a fixed DC voltage of Vcc×0.9. Vcc may be, for example, a constant DC bias supply voltage for a driver IC. The output of the averaging filter (i.e., the fixed DC voltage) may be used by a control circuit in a closed-loop mode.

Because the particular duty cycle needed to operate the converter 804 in critically discontinuous conduction mode (at the particular load condition) is known, an error amplifier may be employed to vary the regulated output voltage of the pre-regulator circuit 902. For example, the error amplifier may compare a fixed DC voltage (e.g., the fixed DC voltage of Vcc×0.9) to an output of the averaging filter which may vary based on a duty cycle of the power switches Q2, Q3. An output of the error amplifier may be employed to vary the regulated output voltage of the pre-regulator circuit 902. This may help keep the duty cycle of the power switches Q2, Q3 substantially equal to the particular duty cycle needed to operate the converter 804 in critically discontinuous conduction mode.

Figure 10:
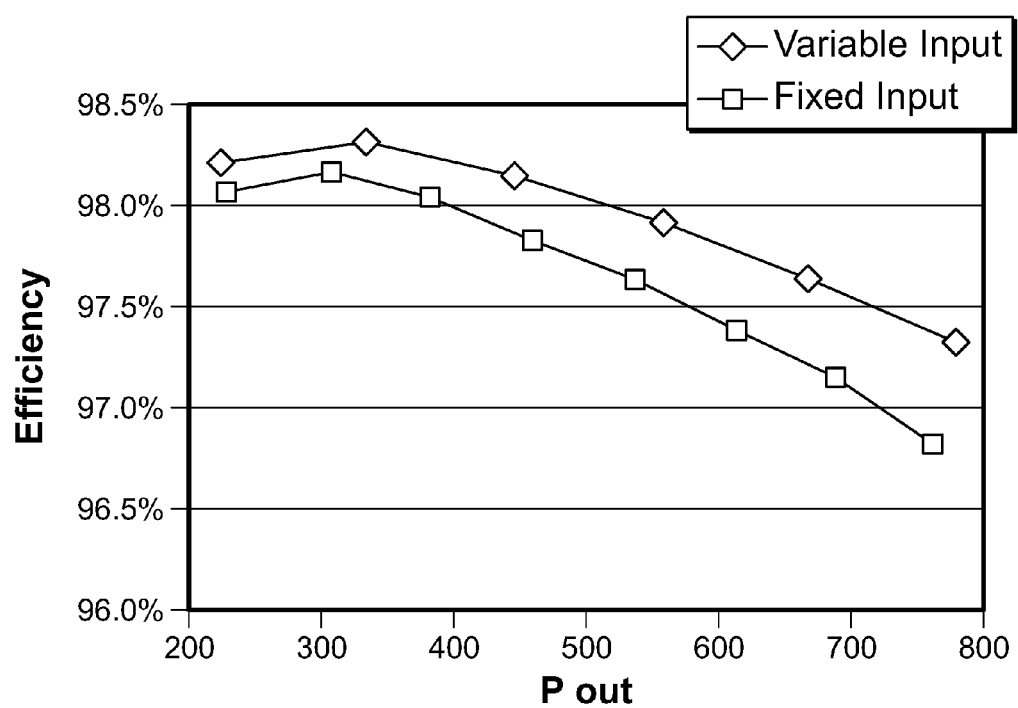
FIG. 10 is a graph illustrating efficiency of a multi-stage power converter employing a fixed input voltage and efficiency of the multi-stage power converter of FIG. 9.

FIG. 10 is a graph showing efficiency of two 750 W multi-stage power converters. One power converter includes the PFC boost AC/DC pre-regulator circuit 902 of FIG. 9 and a LLC resonant converter employing a fixed input voltage to the LLC resonant converter. The other power converter is the multi-stage power converter 900 of FIG. 9.

As shown in FIG. 10, the efficiency of the power converter employing the variable input voltage to the LLC resonant converter is higher than the efficiency of the other power converter. For example, the efficiency of the power supply employing the variable input voltage is 0.5% higher at full-load (750 W) and 0.3% higher at half-load (375 W).

Figure 11:
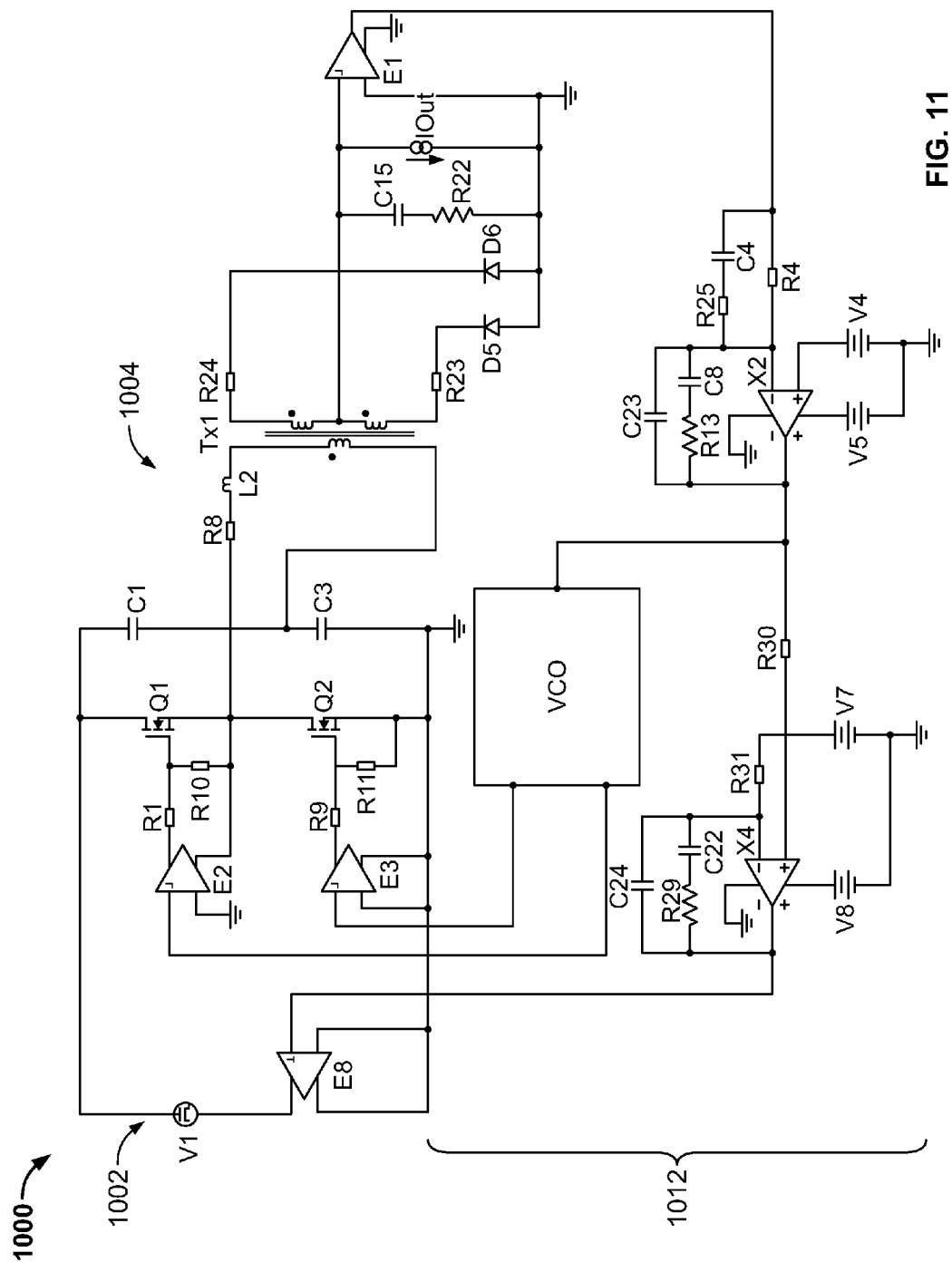
FIG. 11 is a schematic of a multi-stage power converter including a pre-regulator, a LLC half bridge resonant converter, and a control circuit shown as a discrete circuit according to another example embodiment.

FIG. 11 illustrates another example multi-stage power converter 1000 including a pre-regulator 1002 (shown as a variable voltage source), a LLC resonant converter 1004, and a control circuit 1012 coupled to the pre-regulator 1002 and the LLC resonant converter 1004. In the example of FIG. 11, the pre-regulator 1002, the LLC resonant converter 1004, and the control circuit 1012 are shown as a discrete circuit. The power converter 1000 may include the same benefits as explained above.

The control circuit 1012 includes error amplifiers X2, X4, and a voltage controlled oscillator VCO. The control circuit 1012 may receive a sensed output voltage from the LLC resonant converter 1004. The error amplifier X2 may compare the sensed output voltage with a fixed reference voltage V4 and then provide an output to the voltage controlled oscillator VCO and the error amplifier X4.

As shown in the example of FIG. 11, the voltage controlled oscillator VCO may provide signals to operational amplifiers E2, E3 which generate signals to control power switches Q1, Q2 of the LLC resonant converter 1004. Thus, the output voltage of the LLC resonant converter 1004 may be regulated.

The error amplifier X4 may compare the output of the error amplifier X2 to a fixed reference voltage V7. An output of the error amplifier X4 may be provided to an operational amplifier E8 which may vary a voltage of the pre-regulator 1002.

The LLC resonant converters disclosed herein may be any suitable LLC resonant converter including, for example, a forward converter, a flyback converter, a bridge converter (e.g., a half bridge converter as shown in FIGS. 2, 7, 8, 9, 11 or a full bridge converter), etc.

Figure 16:
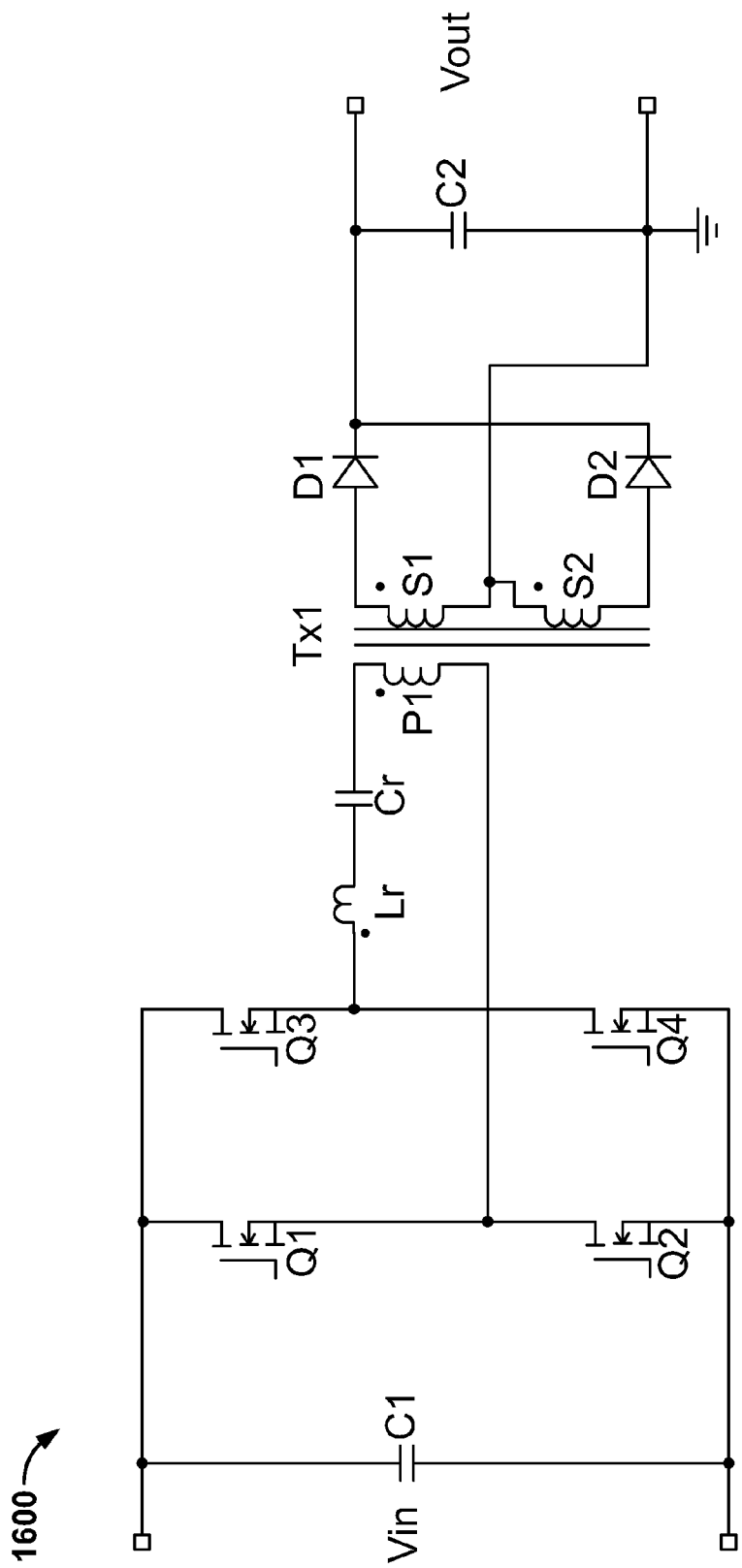
FIG. 16 is a schematic of a multi-stage power converter including a LLC full bridge resonant converter according to another example embodiment.

For example, FIG. 16 illustrates an LLC full bridge converter 1600 having power switches Q1, Q2, Q3, Q4 as well as an input capacitor filter C1, a transformer TX1, resonant elements (e.g., resonant inductor Lr, resonant capacitor Cr, magnetizing inductance of the transformer TX1, etc.), a rectification circuit, and an output capacitor filter C2 as explained above. The power switches Q2, Q3 may conduct during a positive half cycle with respect to the dot convention of a primary winding of the transformer TX1 while Q1, Q4 may conduct during a negative half cycle to provide high frequency AC voltage for the transformer TX1. The resonant elements may be, for example, any suitable value sufficient to cause zero voltage and zero current switching (ZVS, ZCS) of the power switches Q1, Q2, Q3, Q4 as well as switches in the rectification circuit.

Figure 15:
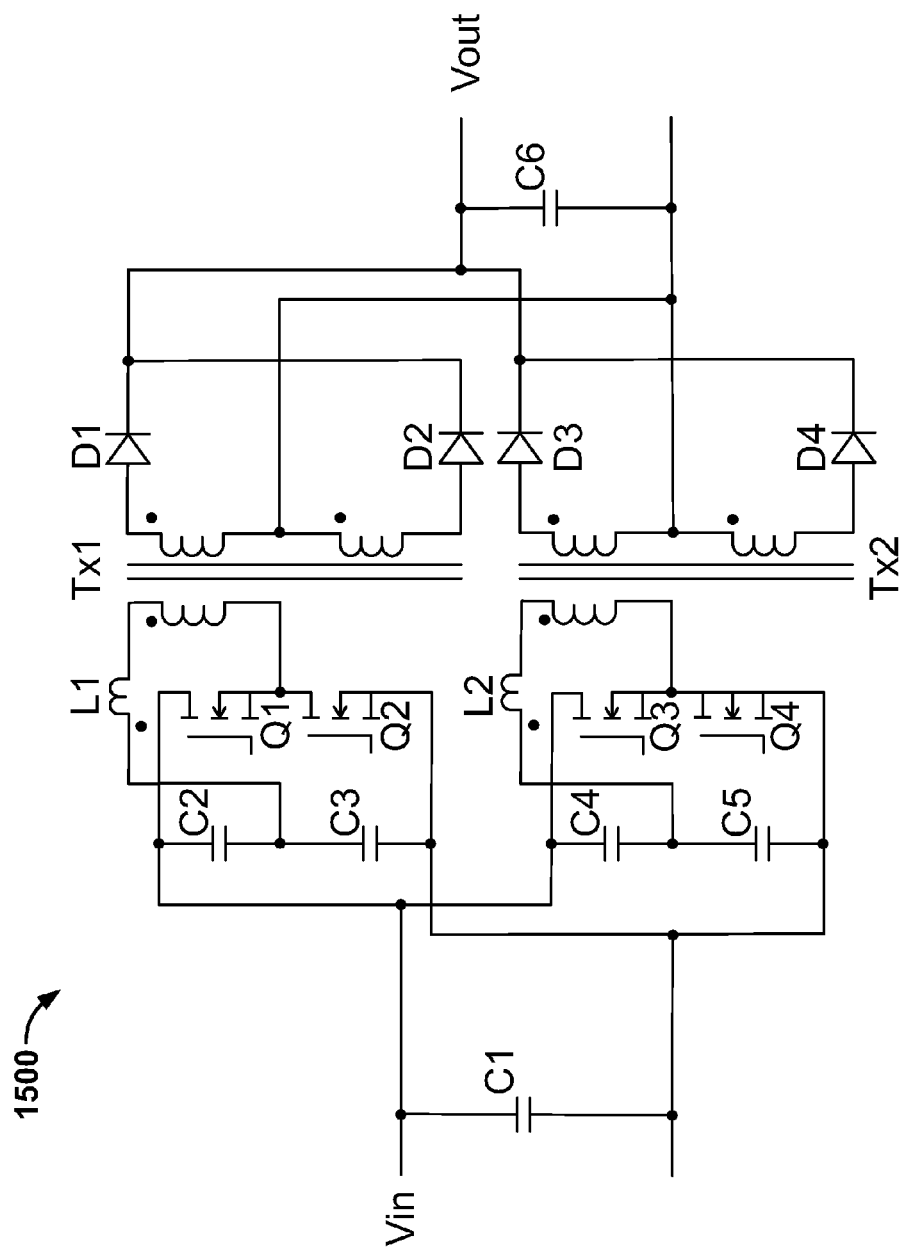
FIG. 15 is a schematic of an interleaved converter including two LLC half bridge resonant converters according to yet another example embodiment.
Figure 17:
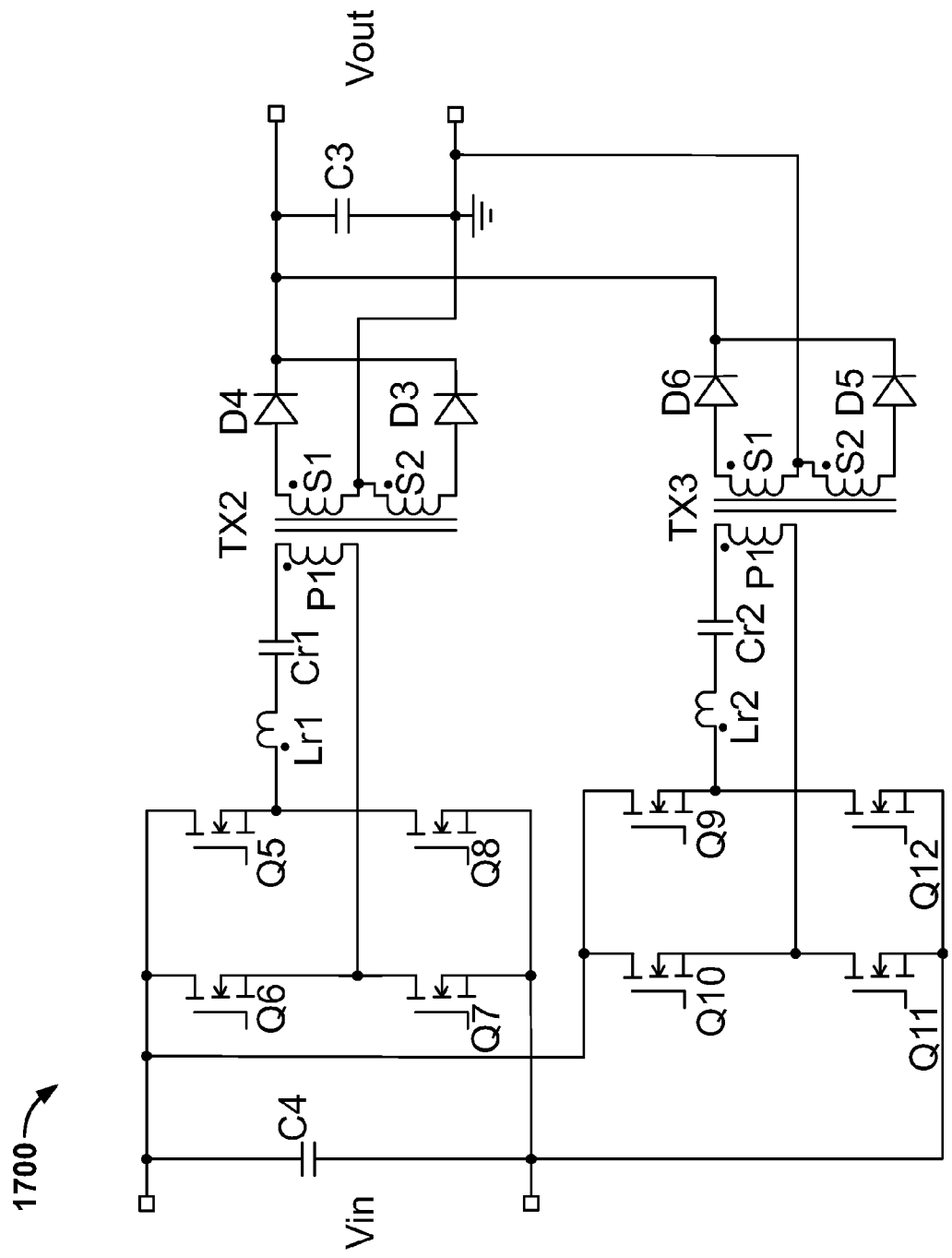
FIG. 17 is a schematic of an interleaved converter including two LLC full bridge resonant converters according to another example embodiment.

In addition, as shown in FIGS. 15 and 17, two LLC resonant converters may be coupled in parallel to form an interleaved converter. The interleaved converter 1500 of FIG. 15 includes two LLC half bridge resonant converters and the interleaved converter 1700 of FIG. 17 includes two LLC full bridge converters.

Figure 14:
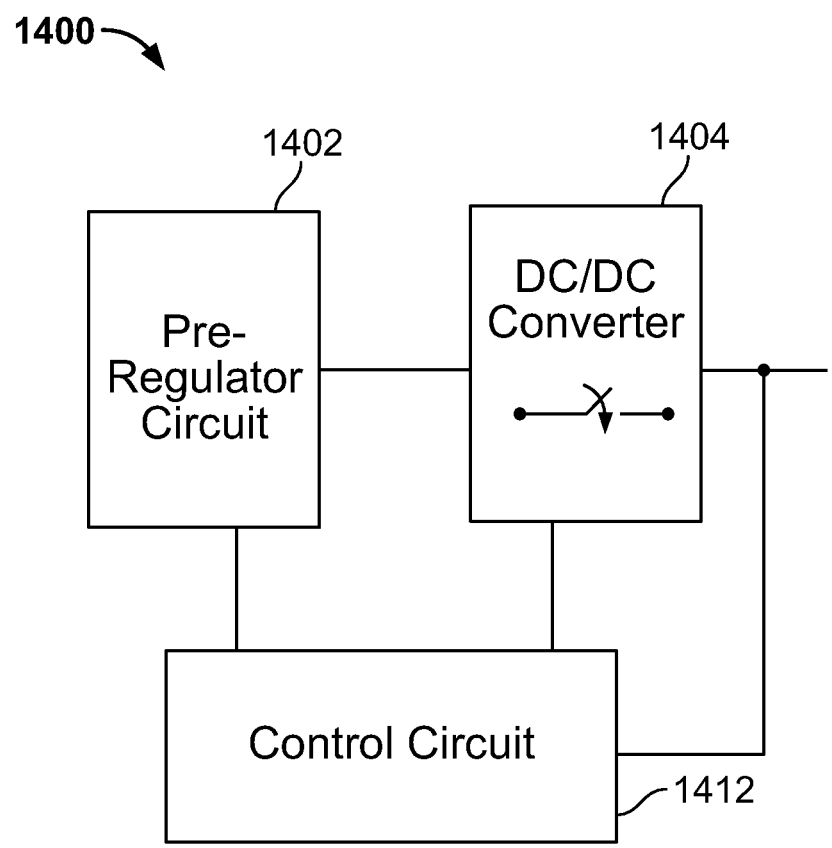
FIG. 14 is a block diagram of a multi-stage power converter including a pre-regulator circuit and a DC/DC converter according to another example embodiment.

Although not shown, inputs of the LLC resonant converters of FIGS. 15 and 17 may be coupled to any one of the pre-regulator circuits disclosed herein. The LLC resonant converters of each interleaved converter may operate with a 90 degree phase shift therebetween and produce overlapping currents at an output Vout of each interleaved converter. The overlapping currents may cause cancellation of ripple current in an output capacitor (e.g., capacitor C6 of FIG. 15 and capacitor C3 of FIG. 17) of each interleaved converter, thereby lowering stress on the output capacitors. The overlapping currents and primary side switch currents of each interleaved converter may be substantially sinusoidal. Although only two LLC resonant converters are shown in FIGS. 15 and 17, more than two LLC resonant converters may be employed without departing from the scope of the present disclosure. Additionally, although FIGS. 1, 2, 7-9, 11, and 15-17 illustrate LLC resonant converters, any suitable DC/DC converter having any suitable topology may be employed without departing from the scope of the present disclosure. For example, FIG. 14 illustrates another example multi-stage power converter 1400 including a pre-regulator circuit 1402, a DC/DC converter 1404 (including one or more power switches), and a control circuit 1412 coupled to the pre-regulator circuit 1402 and the DC/DC converter 1404. The multi-stage power converter 1400 may include the same benefits as described above with respect to the LLC resonant converters.

The pre-regulator circuits disclosed herein may be any suitable circuit that provides a DC voltage and current. For example, the pre-regulator circuits may be an AC/DC converter, a DC/DC converter, etc. and employ any suitable topology (e.g., a buck, boost, etc.). In some embodiments, the pre-regulator circuits may be a PFC AC/DC boost converter as shown in FIG. 9.

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). For example, as shown in FIG. 2, the control circuit 212 employs digital implementation on the primary side of the control circuit 212 and analog implementation on the secondary side. Additionally, the control circuits may provide closed-loop regulation for the pre-regulator circuits and/or the DC/DC converters.

By employing the multi-stage power converters disclosed herein, the resonant converters and the DC/DC converters disclosed herein may substantially operate in a desired mode (e.g., critically discontinuous condition mode) during steady-state conditions throughout a load range. As a result, zero current switching of power switches in the converters may be achieved throughout the load range and thereby voltage stress on rectification circuits, power switches, etc. may be reduced thus allowing for lower voltage rated devices.

Additionally, by operating the resonant converters and the DC/DC converters in critically discontinuous condition mode, RMS losses may be lower, for example, as compared to when the converters are operated in discontinuous condition mode.

Figure 12:
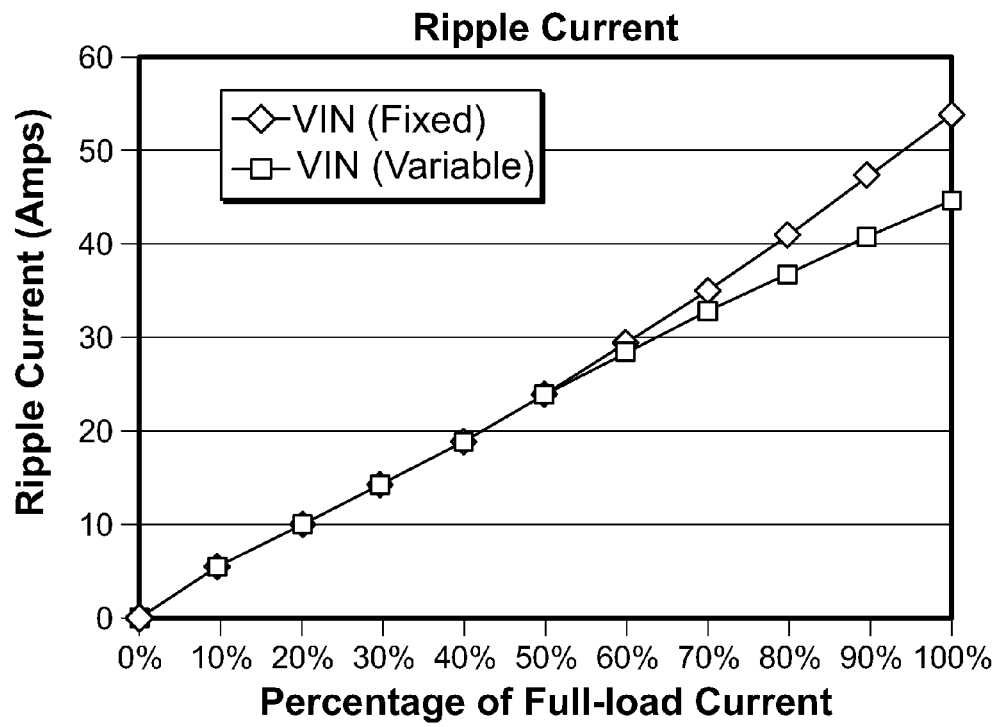
FIG. 12 is a graph illustrating ripple current in a LLC half bridge resonant converter employing a fixed input voltage and ripple current of a LLC half bridge resonant converter employing a variable input voltage.
Figure 13:
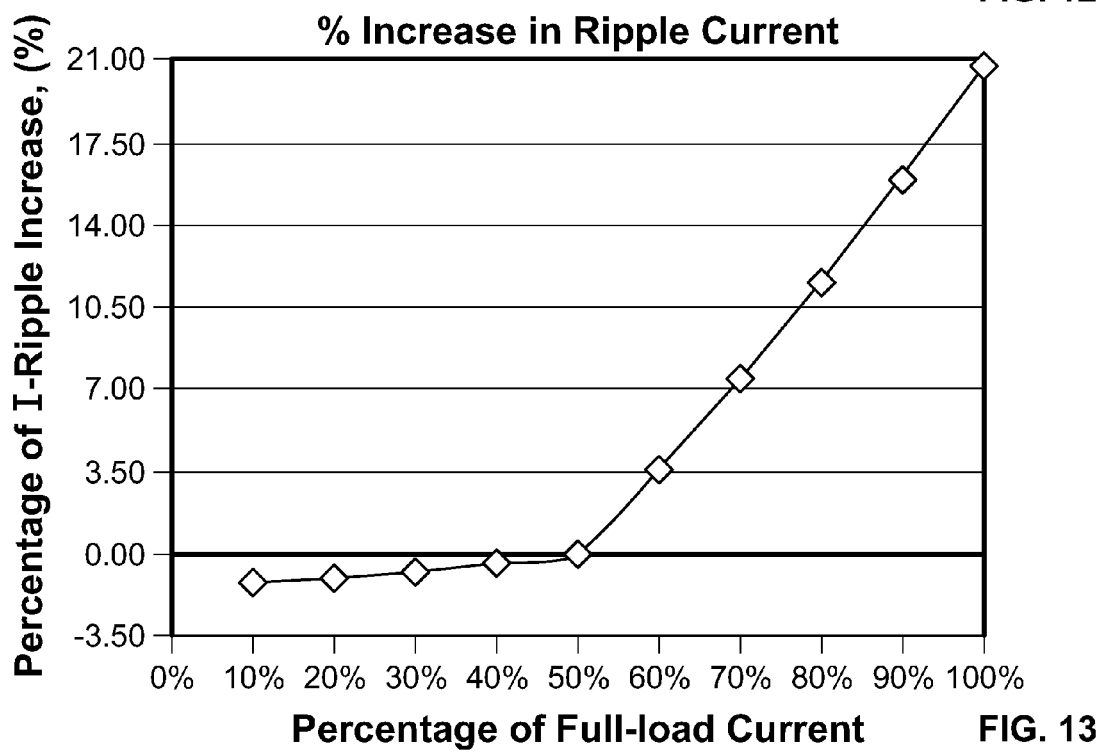
FIG. 13 is graph illustrating a percent increase of the ripple currents of FIG. 12.

Further, by operating the converters in critically discontinuous condition mode at full-load conditions, ripple current in output capacitors may be reduced. Thus, the load-life of the output capacitors may be longer. For example, FIG. 12 illustrates ripple current in an output capacitor of a LLC resonant converter employing a fixed input voltage and a LLC resonant converter employing a variable input voltage as explained above. The LLC resonant converters include an operating input voltage of 400V and a rated output of 12V, 1100 W. As shown in FIG. 12, the LLC resonant converter employing the variable input voltage has reduced ripple current compared to the LLC resonant converter employing the fixed input voltage, particularly at increased load conditions. FIG. 13 illustrates a percent (%) increase in ripple currents of shown in FIG. 12. Equation (2) below is an example equation to calculate the percent (%) increase in the ripple currents.

$$\%_{increase} = \frac{Iripple_{fixed} - Iripple_{variable}}{Iripple_{fixed}} * 100\% \quad (2)$$

Moreover, by providing increased regulated output voltage of the pre-regulator circuits disclosed herein, more energy may be provided to and stored in bulk capacitors of the multi-stage converters. As a result, a hold-up time of the converters may be extended.

In addition, by varying the regulated output voltage of the pre-regulator circuits, efficiency of the pre-regulator circuits may be increased. For example, an optimum efficiency of the pre-regulator circuits may be found based on its varying regulated output voltage, its input voltage, and/or load conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A multi-stage power converter comprising:
   a pre-regulator circuit configured to provide a regulated output voltage, the pre-regulator circuit including one or more power switches;
   at least one LLC resonant converter configured to provide an output voltage and an output current to a load, the LLC resonant converter including an input, an output, one or more resonant elements, and at least one power switch, the input of the LLC resonant converter coupled to the pre-regulator circuit; and
   a control circuit coupled to the pre-regulator circuit and the LLC resonant converter, the control circuit including an error amplifier and a voltage controlled oscillator, the error amplifier configured to produce an output signal that is provided directly to the voltage controlled oscillator, the voltage controlled oscillator configured to provide a control signal to control the at least one power switch of the LLC resonant converter to regulate the output voltage of the LLC resonant converter and provide a variable reference signal representing a switching frequency of the at least one power switch of the LLC resonant converter to control the one or more power switches of the pre-regulator circuit to vary the regulated output voltage of the pre-regulator circuit as a function of the output current of the LLC resonant converter.

2. The multi-stage power converter of claim 1 wherein the LLC resonant converter is configured to operate substantially in a critically discontinuous conduction mode.

3. The multi-stage power converter of claim 1 wherein the LLC resonant converter is configured to operate substantially in a continuous conduction mode.

4. The multi-stage power converter of claim 1 wherein the LLC resonant converter includes a half bridge converter.

5. The multi-stage power converter of claim 1 wherein the pre-regulator circuit includes an AC-DC converter.

6. The multi-stage power converter of claim 1 wherein the pre-regulator circuit includes a DC-DC converter.

7. The multi-stage power converter of claim 1 wherein the LLC resonant converter includes a transformer having a primary winding coupled to the at least one power switch of the LLC resonant converter and a secondary winding coupled to the output of the LLC resonant converter.

8. The multi-stage power converter of claim 7 wherein the LLC resonant converter includes a rectification circuit coupled to the secondary winding of the transformer.

9. The multi-stage power converter of claim 7 wherein the transformer is configured to produce a magnetizing inductance, wherein the one or more resonant elements of the LLC resonant converter are coupled to the primary winding of the transformer, and wherein the magnetizing inductance and the one or more resonant elements of the LLC resonant converter are sufficient to cause zero current switching of the at least one power switch of the LLC resonant converter.

10. The multi-stage power converter of claim 1 wherein the control circuit is configured to switch the at least one power switch at a substantially fixed switching frequency.

11. The multi-stage power converter of claim 1 wherein the control circuit includes a digital controller.

12. The multi-stage power converter of claim 1 wherein the control circuit includes an isolation component coupled between the error amplifier and the voltage controlled oscillator and wherein the error amplifier is configured to provide the output signal directly to the voltage controlled oscillator via the isolation component.

13. A multi-stage power converter comprising:
   a pre-regulator circuit configured to provide a regulated output voltage, the pre-regulator circuit including one or more power switches;
   at least one DC/DC converter configured to provide an output voltage and an output current to a load, the DC/DC converter including an input, an output, and at least one power switch, the input of the DC/DC converter coupled to the pre-regulator circuit; and
   a control circuit coupled to the pre-regulator circuit and the DC/DC converter, the control circuit including an error amplifier and a voltage controlled oscillator, the error amplifier configured to produce an output signal that is provided directly to the voltage controlled oscillator, the voltage controlled oscillator configured to provide a control signal to control the at least one power switch of the DC/DC converter to regulate the output voltage of the DC/DC converter and provide a variable reference signal representing a switching frequency of the at least one power switch of the DC/DC converter to control the one or more power switches of the pre-regulator circuit to vary the regulated output voltage of the pre-regulator circuit as a function of the output current of the DC/DC converter.

14. The multi-stage power converter of claim 13 wherein the DC/DC converter is configured to operate substantially in a critically discontinuous conduction mode.

15. The multi-stage power converter of claim 13 wherein the DC/DC converter is configured to operate substantially in a continuous conduction mode.

16. The multi-stage power converter of claim 13 wherein the DC/DC converter includes a half bridge converter.

17. The multi-stage power converter of claim 13 wherein the control circuit is configured to switch the at least one power switch at a substantially fixed switching frequency.

18. The multi-stage power converter of claim 13 wherein the control circuit includes a digital controller.

19. The multi-stage power converter of claim 13 wherein the control circuit includes an isolation component coupled between the error amplifier and the voltage controlled oscillator and wherein the error amplifier is configured to provide the output signal directly to the voltage controlled oscillator via the isolation component.

20. A method of operating a DC/DC converter configured to receive a regulated output voltage from a pre-regulator circuit, the method comprising:
   generating a control signal with a voltage controlled oscillator in response to an error signal produced by an error amplifier that is provided directly to an input of the voltage controlled oscillator,
   controlling at least one power switch of the DC/DC converter to regulate an output voltage of the DC/DC converter via the control signal provided by the voltage controlled oscillator, and
   controlling one or more power switches of the pre-regulator circuit to vary the regulated output voltage of the pre-regulator circuit as a function of an output current of the DC/DC converter via a variable reference signal representing a switching frequency of the at least one power switch of the DC/DC converter provided by the voltage controlled oscillator.

21. The method of claim 20 wherein controlling the at least one power switch of the DC/DC converter includes controlling the at least one power switch of the DC/DC converter such that the DC/DC converter operates substantially in a critically discontinuous conduction mode.

22. The method of claim 20 wherein controlling the at least one power switch of the DC/DC converter includes controlling the at least one power switch of the DC/DC converter such that the DC/DC converter operates substantially in a continuous conduction mode.

23. The method of claim 20 wherein receiving includes receiving at the voltage controlled oscillator the output signal directly from the error amplifier via an isolation component.

* * * * *